United States Patent
Message et al.

(10) Patent No.: US 7,241,052 B2
(45) Date of Patent: Jul. 10, 2007

(54) MONITORED ROLLER BEARING

(75) Inventors: Olivier Message, Tours (FR); Carole Girardin, Joue-les-Tours (FR); Stephane Reiher, Saint-Bruno (CA); Alain Forcione, Saint-Bruno (CA)

(73) Assignees: Technologies M4 Inc., Longueuil (CA); SKF France, Montigny-le-Bretonneux (FR)

( * ) Notice: Subject to any disclaimer, the term of this patent is extended or adjusted under 35 U.S.C. 154(b) by 143 days.

(21) Appl. No.: 10/503,813

(22) PCT Filed: Feb. 17, 2003

(86) PCT No.: PCT/FR03/00510

§ 371 (c)(1),
(2), (4) Date: Apr. 21, 2005

(87) PCT Pub. No.: WO03/071284

PCT Pub. Date: Aug. 28, 2003

(65) Prior Publication Data

US 2005/0218736 A1    Oct. 6, 2005

(30) Foreign Application Priority Data

Feb. 18, 2002  (FR) .................................. 02 02035

(51) Int. Cl.
*F16C 19/06*   (2006.01)

(52) U.S. Cl. ...................................................... 384/448
(58) Field of Classification Search ................. 384/448, 384/446, 544; 324/174, 173
See application file for complete search history.

(56) References Cited

U.S. PATENT DOCUMENTS 6,338,576 B1    1/2002   Girardin et al.

FOREIGN PATENT DOCUMENTS

| DE | 43 09 332 | 9/1994 |
| DE | 196 32 715 | 2/1998 |
| EP | 1 037 051 | 9/2000 |

*Primary Examiner*—Lenard A. Footland
(74) *Attorney, Agent, or Firm*—Smith, Gambrell & Russell LLP

(57) ABSTRACT

The invention relates to a monitored roller bearing device, comprising a non-rotating race (10), a rotating race (12), at least one row of rolling elements (14) arranged between two rolling tracks (11, 13) on the rotating race (12) and non-rotating race (10) and an information detection module, which comprises a non-rotating sensor unit (29) and a rotating (12) encoder (28). Said device comprises a means for fixing the sensor unit (29) relative to a support (3), by generating an axial force between a support surface (34*b*) on the sensor unit (29) and a support surface (7) on the support (3), while permitting an axial displacement of the sensor unit (29) relative to the support (3).

14 Claims, 3 Drawing Sheets

MONITORED ROLLER BEARING

The present invention relates to the field of monitored roller bearings fitted with a module for detecting the parameters of rotation, such as the angular position, the direction of rotation, the speed, the acceleration.

The invention relates more particularly to a monitored roller bearing comprising a sensor secured to a non-rotating race and an encoder secured to a rotating race, the angular position of the sensor being indexed based on a non-rotating element, so that the angular position of the encoder relative to the fixed element is known.

Such roller bearings are used for example for the driving of synchronous type electric motors. The indexation of the sensor is used to ascertain in particular the speed of rotation and the position of the poles of the rotor relative to the poles of the stator.

Through EP A1 1 037 051, a monitored roller bearing is known in which an encoder element is secured to a shaft, an encoder unit being secured to a rotating race. The rotating race is mounted in a bore of a fixed portion in order to allow an axial displacement relative to the fixed portion, shims exerting an axial force on the non-rotating race to keep it in position. The sensor unit is fitted onto the outer surface of the non-rotating race. Pins disposed axially, projecting into orifices made in the fixed portion and into the sensor, angularly secure the sensor and the non-rotating portion, while allowing an indexation of the sensor relative to the fixed portion.

Nevertheless, such a device, using on the one hand shims to exert an axial force on the non-rotating race and on the other hand pins to angularly immobilize the sensor relative to the fixed portion is costly and difficult to assemble.

The invention proposes a monitored roller bearing device comprising means for angularly immobilizing a non-rotating portion of the device on a support while allowing an axial displacement of the device relative to the support, having a limited number of pieces, and capable of being obtained at low cost.

A monitored roller bearing device, of the type comprising a non-rotating race, a rotating race, at least one row of rolling elements arranged between two rolling tracks of the rotating race and non-rotating race, and an information detection module comprising a non-rotating sensor unit and a rotating encoder. According to one aspect of the invention, the monitored roller bearing device comprises a means for immobilizing angularly the sensor unit relative to a support, by exerting an axial force between a support surface of the sensor unit and a support surface of the support and by permitting an axial displacement of the sensor unit relative to the support.

Thus, the sensor unit remains angularly immobile relative to the support in a predefined relative angular position. The means for angularly immobilizing the sensor unit on the support is axially preloaded between a support surface of the sensor unit and a support surface of the support to exert an axial force between said support surfaces. The monitored roller bearing device can be kept in an appropriate angular position, while allowing an axial displacement within a certain limit of the sensor unit relative to the support.

Advantageously, the angular immobilization means also consists of an angular means of indexation of the sensor unit relative to the support. When the sensor unit is installed, the angular indexation of the position of the sensor unit relative to the support can be used to ascertain accurately the angular position of the sensor unit relative to the support, which will not change thanks to the angular immobilization means.

In one embodiment, the angular immobilization means comprises at least one axially elastic lug, comprising a first end pressing axially on the support surface of the sensor unit, and a second end opposite the first end and pressing axially on a support surface of the support. The elastic deformation of the lug, allowing the axial displacement of the sensor unit relative to the support, is accompanied by the generation of an axial force between the support surface of the sensor unit and the support surface of the support.

Advantageously, the angular immobilization means interacts with at least one groove made on a support surface. In preference a groove is radial.

In one embodiment, the groove is made on the support surface of the sensor unit.

In one embodiment, the groove is made on the support surface of the support.

Advantageously, a lug comprises at least one end projecting into a groove made on a support surface. The lug projecting into a groove made on a support surface allows a link in rotation.

Advantageously, a groove has an open profile, comprising a radial bottom surface and inclined flange surfaces. Thus, the lug interacts with the inclined flange surfaces of the groove such that the lug projecting into the radial groove is inserted into the groove until it is in simultaneous contact with the two inclined flange surfaces of the groove, such that there is no angular clearance between the sensor unit and the elastic lug.

Advantageously, the lug is pressing on inclined flange surfaces of the groove.

Advantageously, the angular immobilization means comprises a plurality of axially elastic lugs. The lugs are independent or interlinked. The use of a plurality of lugs enable to distribute and balance the force exerted on a support surface. Depending on the number of lugs, their profile and the elasticity of the material used, a greater or lesser force will be created between the support surfaces as a function of the relative axial displacement of the support surfaces. The linking of the lugs allows the lugs to interact in order to angularly immobilize the sensor unit relative to the support.

In one embodiment, the lugs originate from a ring secured to the support. The ring may be in direct contact on one support surface, distributing an axial force over the whole support surface. The use of a ring also makes it possible to obtain lugs in a single assembly in order to facilitate their installation which is done in a single operation for all the lugs.

In another embodiment, the lugs originate from a ring secured to the sensor unit. Preferably, the ends of the lugs furthest from the ring are free.

The monitored roller bearing device is suitable for use in an electric motor comprising a stator, a rotor, and a first roller bearing device.

The present invention and its advantages will be better understood on studying the detailed description of the embodiments taken as nonlimiting examples and illustrated by the appended drawings in which.

Figure 1:
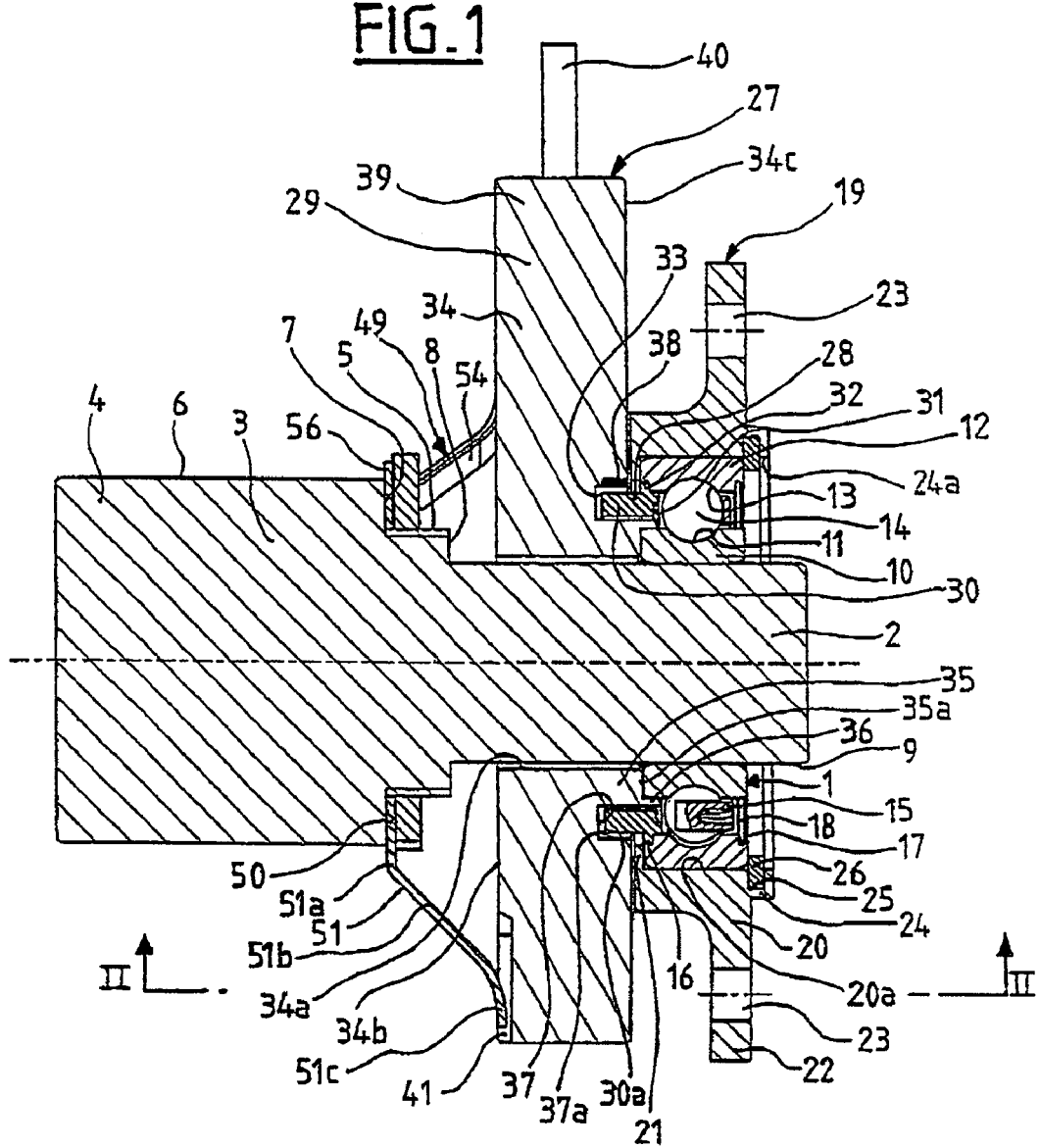
FIG. 1 is a view in axial section of a monitored roller bearing device.
Figure 3:
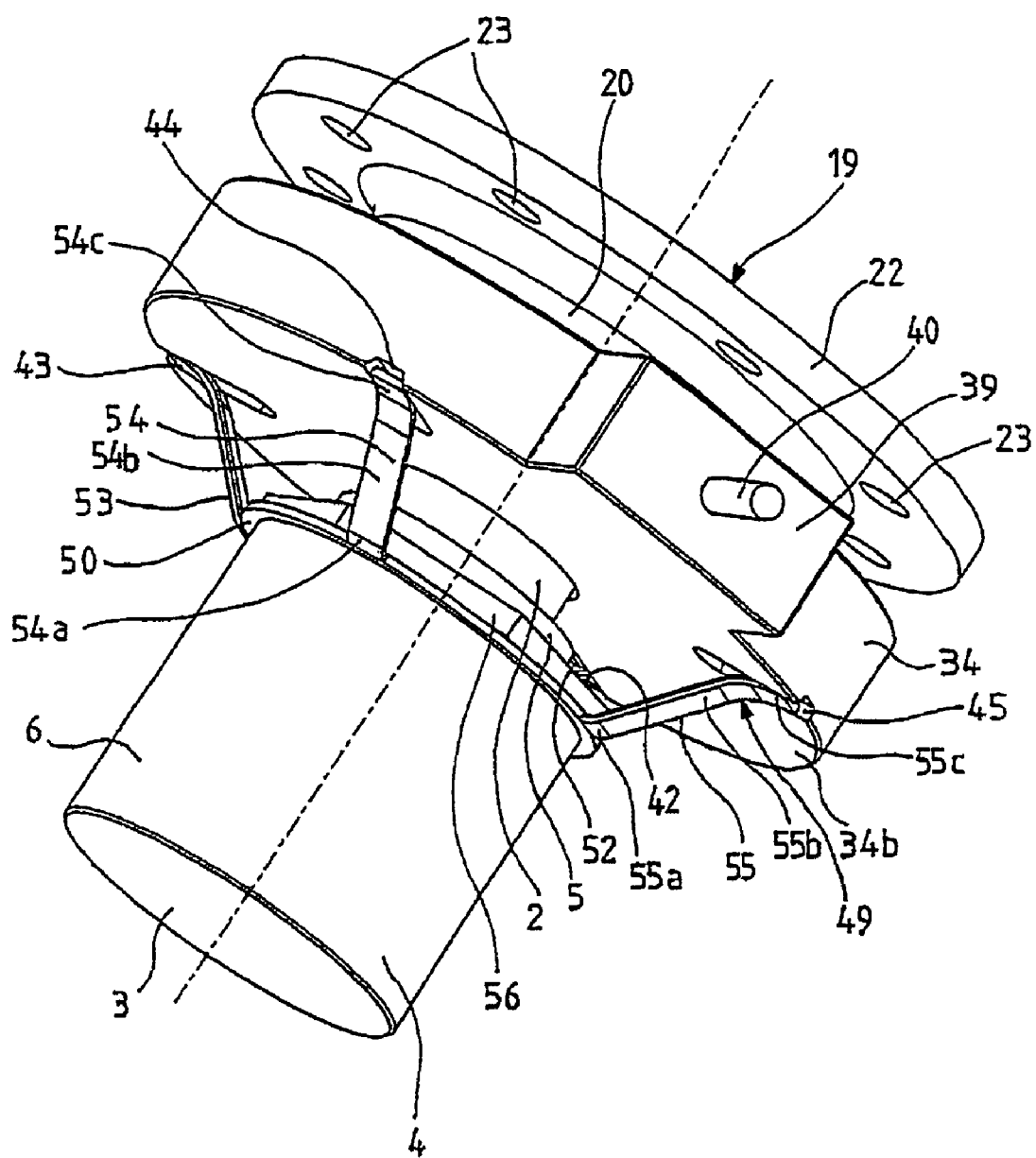
FIG. 3 is a view in perspective of the monitored roller bearing device in FIG. 1.

In FIGS. 1 and 3, the monitored roller bearing, referenced 1 in its entirety, is mounted on an end 2 of a non-rotating shaft 3. Said shaft 3 comprises a cylindrical axial portion 4 of external diameter greater than the external diameter of the end 2 of the shaft 3. A cylindrical bearing surface 5 is formed between the end of the axial portion 4 and the end 2 of the shaft 3, and has an external diameter smaller than the external diameter of the axial portion 4 while being greater than the external diameter of the end 2. A radial support surface 7 extends between the cylindrical bearing surface 5 and the outer surface 6 of the axial portion 4. A radial surface 8 extends between the cylindrical outer surface 9 of the end 2 of the shaft 3 and the cylindrical bearing surface 5. The cylindrical bearing surface 5 is threaded on its outer surface.

The roller bearing 1 comprises an inner race 10 provided on its outer surface with a rolling track 11, an outer race 12 provided on its inner surface with a rolling track 13, a row of rolling elements 14, here balls, arranged between the rolling tracks 11 and 13 of the inner race 10 and the outer race 12, and kept circumferentially spaced by a cage 15. The outer race 12 comprises on its inner surface two annular grooves 16, 17 adjacent to the axial ends opposite the outer race 12. The inner race 10 is mounted on the outer surface 9 of the end 2 of the shaft 3, with a tight-sliding fit. The roller bearing 1 could comprise a plurality of rows of rolling elements, for example 2. Furthermore, different rolling elements, such as rollers or needles can be used.

A sealing element 18 fixed into the annular groove 17 of the outer race 12 axially on the side of the outer race 12 opposite the axial portion 4 of the shaft 3, comes into friction contact with the outer surface of the inner race 10. The sealing element 18 seals the inner space of the bearing 1, lying radially between inner race 10 and the outer race 12, against the ingress of foreign bodies, or against leaks of lubricant, such as the grease placed in the bearing 1.

A rotating element 19 comprises an axial portion 20 having a bore 20a into which the outer race 12 of the bearing 1 is fitted. An annular wall 21 extends radially inward from the end of the axial portion 20 of the rotating element 19, axially from the side opposite the sealing element 18. The outer race 12 of the bearing 1 comprises a front face coming into axial contact with the annular wall 21 of the rotating element 19. The annular wall 21 of the rotating element 19 has an inner diameter greater than the diameter of the bore of the outer race 2.

A radial side 22 extends radially outward from the end of the axial portion 20 opposite the annular wall 21. The radial side 22 is provided with drill holes 23 circumferentially spaced and intended to be used for the attachment of the rotating element 19 onto a unit rotating relative to the shaft 3, a wheel for example. The rotating element 19 comprises an annular shoulder 24 extending axially from the zone of least diameter of the radial wall 23, and whose bore 24a extends the bore 20a of the axial wall 20. An annular groove 25 of rectangular profile is partially formed in the bore 24a while protruding axially onto the bore 20a. A retention unit 26, of the circlip type, lodged in the groove 25, butts axially against a front face of the outer race 12 opposite the face of the outer race 12 butting axially against the annular wall 21 of the rotating element 19. The annular wall 21 and the retention unit 26 axially retain the outer race 12 of the bearing 1 in the bore 20a of the rotating element 19. The outer race 12 is force fitted into the bore 20a of the rotating element 19, the outer race 12 being secured in rotation to the rotating element 19.

A detection module referenced 27 in its entirety comprises an encoder ring 28 and a sensor unit 29. The encoder ring 28 comprises an annular portion 30 situated radially in part between the inner race 10 and the outer race 12 projecting axially from the inner space of the bearing 1. The annular portion 30 comprises an inner cylindrical bearing surface 31, axially from the side of its end adjacent to the rotating elements 14. The annular portion 30 is fitted onto the inner surface of the outer ring 12.

The annular portion 30 comprises an annular shoulder 32 projecting radially outward, close to the axial end of the annular portion 30 of the side of the rotating elements 14. The annular shoulder 32 projects radially into the annular groove 16 of the outer race 12, to secure the encoder 28 angularly and axially onto the outer race 12. On the side opposite its end adjacent to the rotating elements 14, the annular portion 30 extends axially beyond the annular wall 21 of the rotating element 19. An active part of the encoder is situated on a portion 33 of the outer surface 30a of the annular portion 30 adjacent to the axial end of the annular portion 30 opposite the annular shoulder 32.

The sensor unit 29 comprises an annular ring 34 disposed axially on the same side of the bearing 1 as the encoder 28. The annular ring 34 is provided with a bore 34a of diameter greater than the outer surface 9 of the end 2 of the shaft 3, with a radial support surface 34b oriented toward the axial portion 4 of the shaft 3, and with a radial surface 34c axially opposite the radial support surface 34b. The radial surface 34c comes axially close to the annular wall 21 of the rotating element 19 forming a narrow radial passage with the annular wall 21.

An axial shoulder 35 projects axially from the zone of smallest diameter of the radial surface 34c of the annular ring 34, on the side of the bearing 1. The axial shoulder 35 comprises an end radial surface 35a coming into axial contact with a front wall of the inner race 10. An annular ridge 36 extends axially from the zone of greater diameter of the axial shoulder 35 and fits onto the outer surface of the inner race 10.

The annular ring 34 comprises on the radial surface 34c an annular groove 37 of rectangular section, radially adjacent to the axial shoulder 35. The annular portion 30 of the encoder 28 projects axially into the angular groove 37.

The annular ring 34 comprises a detection unit 38 lightly touching the flange surface 37a of greater diameter of the annular groove 37, radially facing the active portion of the encoder 28 situated on the outer surface of the annular portion 30 of the encoder 28. If the active portion is a succession of reflective and nonreflective portions, the detection module 38 is of the optical type. If the active portion is a multipole magnetic ring, the detection module 38 is of the magnetism-sensitive type, for example a Hall effect cell. Other types of encoders and sensors may be envisaged.

The sealing of the air gap of the detection unit 27, situated radially between the outer surface 30a of the annular portion 30 of the encoder 28 and the detection unit 38, is provided on the one hand by the narrow passage formed between the radial surface 34c of the annular ring 34 and the annular wall 21 of the rotating element 19, and on the other hand by the other narrow passage formed radially between the shoulder 35 and the annular portion 30 of the encoder 28. Specifically, the ingress of foreign bodies into the air gap of the detection unit 27 could disrupt the measurements made by said detection unit 27.

A connection portion 39 projects radially from the annular ring 34. A wire 40 projecting radially toward the outside of the connection portion 39 is connected to the detection unit 38 in a manner not shown.

Figure 2:
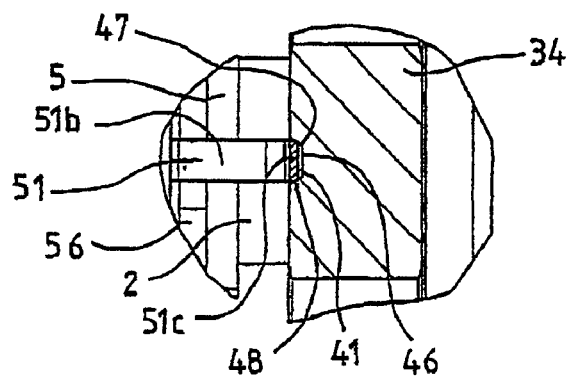
FIG. 2 is a partial view in section along II—II in FIG. 1.

The radial support surface 34b of the annular ring 34 comprises five radial grooves 41, 42, 43, 44, 45, circumferentially regularly spaced. As can be seen in FIG. 2, the radial groove 41, having an open profile section, comprises a radial bottom surface 46 and inclined flange surfaces 47, 48. As can be seen in FIG. 3, the groove 41 extends radially to the outer surface of the annular ring 34. The grooves 42, 43, 44, 45 are similar to the groove 41.

An angular immobilization means 49 comprises a ring 50 centered on the bearing surface 5 of the shaft 3 pressing axially on the radial support surface 7 of the shaft 3. The immobilization means 49 comprises five lugs 51, 52, 53, 54, 55 originating from the ring 50.

The lug 51 comprises a first end 51a connected at the periphery of the ring 50, a portion 51b extending obliquely, radially outward, toward the radial support surface 34b of the annular ring 34, and a second free radial end 51c, opposite the first end 51a, and projecting into the radial groove 41 of the radial support surface 34b of the annular ring 34.

The free end 51c of the lug 51 projecting into the radial groove 41 has inclined surfaces forming a trapezoidal section to interact with the inclined flange surfaces 47, 48 of the radial groove 41. The other lugs 52, 53, 54, 55 are similar to the lug 51.

A nut 56 is screwed onto the thread of the bearing surface 5 of the shaft 3, and axially and angularly immobilizes the ring 5 on the radial surface 7 of the shaft 3. The lugs 51, 52, 53, 54, 55 are then secured in rotation to the non-rotating shaft 3 serving as a support.

Any appropriate means may be envisaged for angularly indexing the angular immobilization means 49 relative to the non-rotating shaft 3 before the nut 56 is tightened.

The lugs 51, 52, 53, 54, 55 projecting into the radial grooves respectively 41, 42, 43, 44, 45, immobilize the rotation of the annular ring 34 of the sensor unit 29, relative to the ring 50, and therefore to the non-rotating shaft 3. The sensor unit 29 is angularly immobile relative to the shaft 3.

Since the radial grooves 41, 42, 43, 44, 45 have inclined flange surfaces forming an open trapezoidal profile, the free ends of the lugs 51, 52, 53, 54, 55, having a matching shape, project into the grooves 41, 42, 43, 44, 45 until each one presses simultaneously on the two inclined flange surfaces of each radial groove 41, 42, 43, 44, 45. This simultaneous contact is used to ensure that there is no angular clearance radially between the sensor unit 29 and the lugs 51, 52, 53, 54, 55 as could be the case if the grooves and the lugs had a rectangular section. Inclined flange surfaces, like the flange surfaces 47, 48, are used to take up the angular clearances. The angular position of the sensor unit relative to the lugs 51, 52, 53, 54, 55 is therefore precise. Naturally, other sections of the grooves and of the lugs are suitable for producing the same effect of removing the angular clearance.

The slenderness of the lugs 51, 52, 53, 54, 55, the great length of the oblique portions and the elasticity of the material allow the lugs 51, 52, 53, 54, 55 to deform axially in such a way as to allow a relative axial displacement of the sensor unit 29 relative to the end 2 of the shaft 3, the axial contact between the free ends of the lugs 51, 52, 53, 54, 55 and the grooves 41, 42, 43, 44, 45 being constantly maintained during the permitted relative axial displacement of the sensor unit 29 relative to the shaft 3.

When they deform, the lugs 51, 52, 53, 54, 55 exert by elasticity an axial force on the radial support surface 34b of the sensor unit, the ring 50 exerting an opposite axial force on the radial support surface 7 of the shaft 3. An axial displacement of the sensor unit 29 toward the ring 50 causes an increase in the axial force exerted by the lugs 51, 52, 53, 54, 55. An axial displacement of the sensor unit 29 on the side opposite to the ring 50 causes a diminution of the axial force exerted by the lugs 51, 52, 53, 54, 55.

The sensor unit 29 having a shoulder 35 provided with a radial surface 35a resting axially on a frontal surface of the inner race 10 transmits the axial forces exerted by the lugs 51, 52, 53, 54, 55 on the radial support surface 34b to the inner race 10.

The diameter of the bore 34a of the annular ring 34 being greater than the diameter of the outer surface 9 of the end 2, the sensor unit 29 can move freely axially relative to the end 2 of the shaft 3. The sensor unit 29, whose annular ridge 36 is fitted onto the outer surface of the inner race 10, is secured to the inner race 10. The inner race 10 being mounted with a tight-sliding fit on the outer surface 9 of the end 2 of the shaft 3, the race 10 can have an axial movement relative to the end 2 of the shaft 3.

Preferably, the lugs 51, 52, 53, 54, 55 are adapted so that, when the mechanical assembly is in a normal idle position, the lugs 51, 52, 53, 54, 55 exert an axial force on the radial support surface 34b. Thus, the axial force transmitted by the sensor unit 29 on the inner race 10 is used to exert a preload force on the bearing 1 disposed in a normal position of use. In addition, the lugs 51, 52, 53, 54, 55 can be dimensioned in such a way that, irrespective of the axial position of the roller bearing 1 on the end 2 of the shaft 3 when the roller bearing device is being used, the lugs 51, 52, 53, 54, 55 exert an axial force on the radial support surface 34b. This ensures that the lugs 51, 52, 53, 54, 55 will always be in contact with the radial support surface 34b and that the bearing 1 will always be subject, during its use, to a preload force.

During operation of the monitored roller bearing device, if an axial force applied to the bearing 1 or to the shaft 3 tends to displace the bearing 1 axially relative to the shaft 3, the lugs 51, 52, 53, 54, 55 allowing a slight axial displacement by deforming, said lugs 51, 52, 53, 54, 55 remaining in contact with the radial surface 34b of the sensor unit 29 and thus ensuring maintenance of the angular link and of the angular indexation between the sensor unit 29 and the non-rotating shaft 3.

The length of the radial grooves 41, 42, 43, 44, 45 is suitable for allowing the deformation of the lugs 51, 52, 53, 54, 55. Specifically, when the sensor unit 29 comes close to the axial portion 4 of the shaft 3, the lugs 51, 52, 53, 54, 55 tend to deform by opening radially outward. The free ends of the lugs 51, 52, 53, 54, 55 pressing into the grooves 41, 42, 43, 44, 45 then slide radially outward in the grooves 41, 42, 43, 44, 45. Since the grooves 41, 42, 43, 44, 45 extend to the outer surface of the annular ring 34, the sliding of the lugs 51, 52, 53, 54, 55 is not hampered. When the sensor unit 29 tends to move away from the axial portion 4 of the shaft 3, the radial grooves 41, 42, 43, 44, 45 must extend radially inward in order to allow the sliding of the lugs 51, 52, 53, 54, 55 which return to a position of lesser deformation.

Since the lugs 51, 52, 53, 54, 55 project into the radial grooves 41, 42, 43, 44, 45 and angularly secure the sensor unit 29 and the shaft 3 serving as a support, the sensor unit 29 is oriented angularly relative to the fixing lugs 51, 52, 53, 54, 55. Preferably, the ring 50 of the immobilization means 49 may itself comprise a means of indexation of the ring 50 on the shaft 3, such as a tab projecting into an axial groove made on the bearing surface 5 of the shaft 3. Thus, the angular position of the ring relative to the shaft 3 is precisely defined, such that the angular position of the sensor unit 29 and therefore of the detection module 38 relative to the shaft 3 is also precisely known.

The ring 50 could be secured to the shaft 3 by a means other than the nut 56. For example, since the immobilization means 49 is suitable to be preloaded, the ring 50 permanently sustains a force which moves it close to the radial surface 7. Bonding could suffice to attach the ring 50. It could also be secured by a ratchet mechanism, an annular groove adjacent to the radial surface 7 being formed on the outer surface of the cylindrical bearing surface 5, a lug originating from the ring 5 extending obliquely on the side opposite the radial surface 7, radially inward, and having an end in friction contact with a flange surface or a bottom surface of the annular groove to angularly secure the ring 50 and the shaft 3. The elastic deformation of the lug allows the ring to be inserted, until the lug is released in the annular groove and prevents an inverse axial movement of the ring 50.

It is possible to envisage that the lugs 51, 52, 53, 54, 55 be circumferentially irregularly spaced, in order to easily determine the appropriate and unique angular position of the sensor unit 29 relative to the shaft 3. It is also possible to envisage other means, such as foolproof devices or marks, to allow an angular orientation of the sensor unit when the roller bearing device is assembled.

Since the angular immobilization means 49 is used to immobilize and index the sensor unit 29 angularly relative to the shaft 3, an accidental rotation of the inner race 10 relative to the sensor unit 29 will not cause an angular movement of the sensor unit 29 relative to the shaft 3, thus not disrupting the position measurements made by the detection module 27.

Radial grooves 41, 42, 43, 44, 45 have been provided. Non-radial grooves and corresponding lugs 51, 52, 53, 54, 55 could of course be provided without departing from the scope of the invention.

Figure 4:
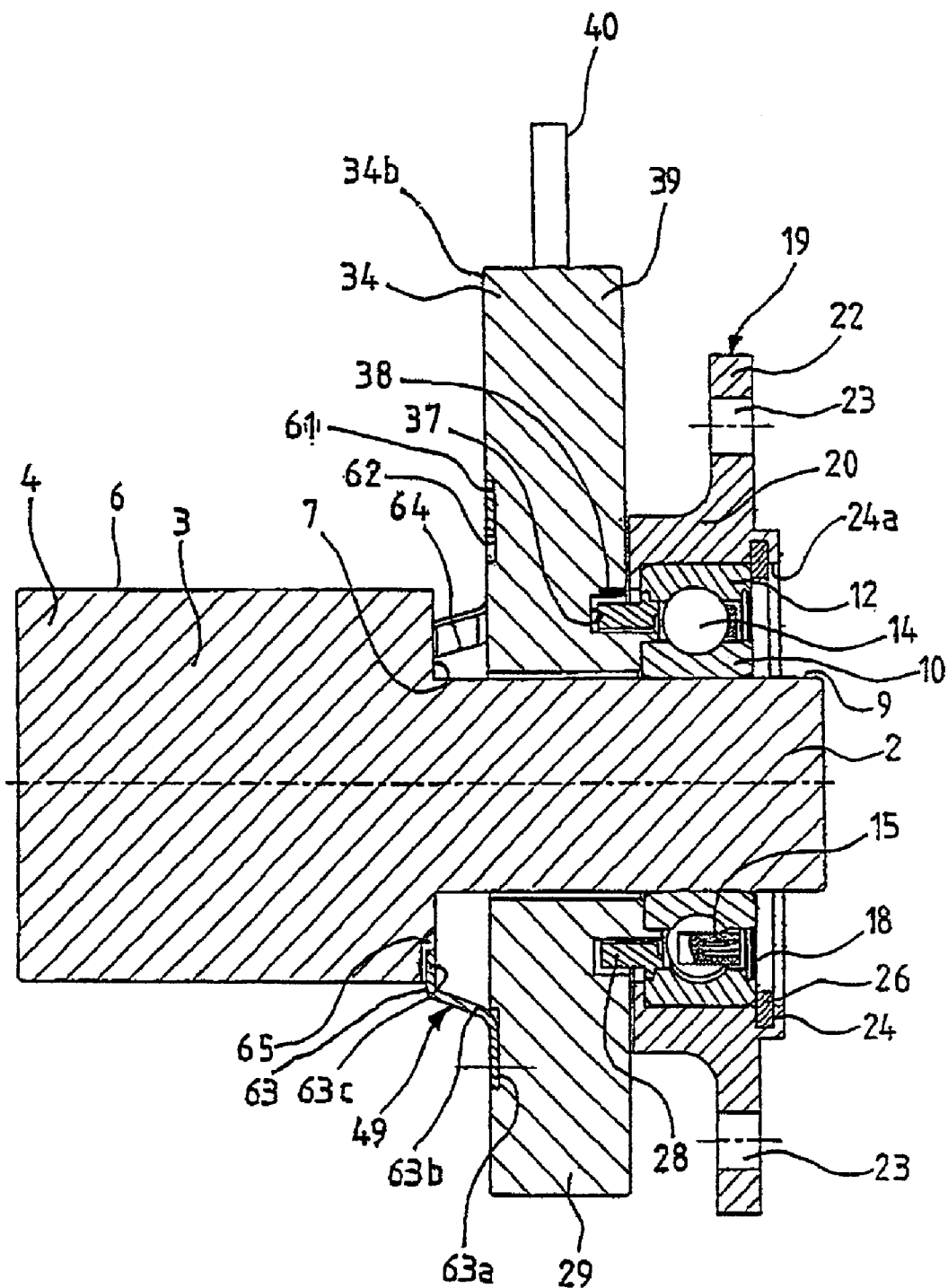
FIG. 4 is a view in axial section of a second embodiment of the monitored roller bearing device.

In FIG. 4, the references of similar elements have been reused. The angular immobilization means 49 comprises a ring 61 of large diameter disposed in an annular recess 62 made on the radial surface 34b of the sensor unit 29, said ring 61 being attached to the sensor unit by means of screws symbolized by dot-and-dash lines in FIG. 4 for better clarity of the drawing. Five lugs, of which only the lugs 63 and 64 are visible in the figure, originate from the ring 61. Since the lugs are identical, only lug 63 is described in detail.

The lug 63 comprises a first end 63a connected to a zone of lesser diameter of the ring 61, a portion 63b extending obliquely, radially inward, toward the radial surface 7 of the shaft 3. The lug 63 comprises a second free radial end 63c, opposite the first end 63a, projecting into a radial groove 65 made on the radial surface 7 of the shaft 3. Each lug of the angular immobilization means 49 is associated with a radial groove made in the radial surface 7. The operation of the second embodiment of the roller bearing device is similar to the mode of operation of the first embodiment. The dimensions of the radial groove 65 are adapted so as not to hamper the deformation of the lug 63 by allowing the second end 63c of the lug 63 to slide radially in the groove 65.

A description has been given of the embodiments in which the lugs have two ends: one free end projecting into a groove made in a support surface and one end embedded in a ring attached on an opposite support surface. In another embodiment, the lugs are not connected by a ring. Each lug is independent and has one free end projecting into a groove made in a support surface and one end attached to an opposite support surface. The end attached to a support surface may also project into a groove made on said support surface. The attached end may be the end in contact with the support surface of the support, or the end in contact with the support surface of the sensor unit.

Again provision can be made for the two ends of a lug to be attached to the corresponding support surfaces, one end or both ends projecting into a groove, or no groove being provided. Again provision can be made for the two ends of a lug to be embedded in a ring attached to the corresponding support surface.

The angular immobilization means has been described as comprising several lugs. Naturally, an angular immobilization means comprising a single lug could be suitable.

The monitored roller bearing device, according to the invention, is used to angularly immobilize the sensor unit relative to a support, while transmitting an axial force between a radial surface of the support and a radial surface of the sensor unit. It is also possible to obtain a monitored roller bearing allowing an axial displacement of the monitored roller bearing relative to the support. It is also possible, with the same device, to obtain an angular indexation of the sensor unit relative to the support. The monitored roller bearing device thus obtained, having a limited number of pieces, has a low cost of production and can be assembled in a limited number of operations.

The invention claimed is:

1. An instrumented rolling bearing device, of the type comprising a non-rotating race, a rotating race, at least one row of rolling elements arranged between two raceways of the rotating race and non-rotating race, an information detection module comprising a non-rotating sensor unit and a rotating encoder, and a means for immobilizing angularly the sensor unit relative to a support, by permitting an axial displacement of the sensor unit relative to the support, and wherein the angular immobilization means exerts an axial preloading force between a support surface of the sensor unit and a support surface of the support .

2. The device as claimed in claim 1, wherein the angular immobilization means also constitutes a means of angular indexation of the sensor unit relative to the support.

3. The device as claimed in claim 1, wherein the angular immobilization means comprises at least one axially elastic lug comprising a first end pressing axially on the support surface of the sensor unit, and a second end opposite the first end and bearing axially on a support surface of the support.

4. The device as claimed in claim 1, wherein the angular immobilization means interacts with at least one groove made in a support surface.

5. The device as claimed in claim 4, wherein the groove is made on the support surface of the sensor unit .

6. The device as claimed in claim 4, wherein the groove is made on the support surface of the support.

7. The device as claimed in claim 4, wherein a lug comprises at least one end projecting into a slot made on a support surface.

8. The device as claimed in claim 4, wherein a groove possesses an open profile, comprising a radial web surface and inclined flange surfaces.

9. The device as claimed in claim 7, wherein a lug is pressing on the inclined flange surfaces of a groove.

10. The device as claimed in claim 1, wherein the annular immobilization means comprises a plurality of axially elastic lugs.

11. The device as claimed in claim 10, wherein the lugs originate from a ring secured to the support.

12. The device as claimed in claim 10, wherein the lugs originate from a ring secured to the sensor unit.

13. An electric motor comprising a stator, a rotor, a first rolling bearing device and a second rolling bearing device as claimed in claim 1.

14. The device as claimed in claim 4, wherein a groove is radial.

* * * * *